(No Model.)
G. A. BOWEN.
RUNNING GEAR FOR VEHICLES.
No. 381,981. Patented May 1, 1888.
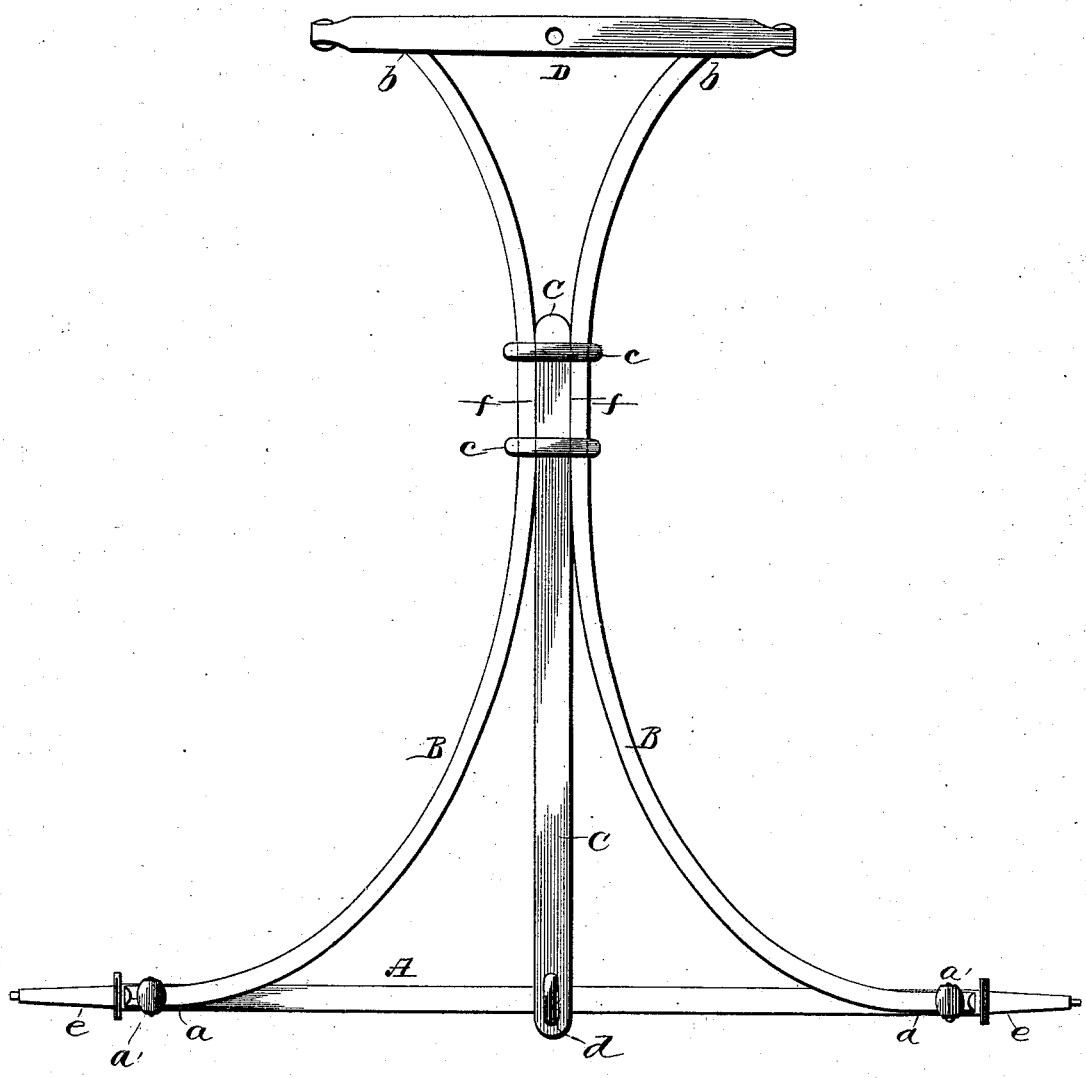
Witnesses.
G. F. Downing
V. E. Hodges
Inventor.
George A. Bowen.
By his Attorney.
H. A. Seymour.

UNITED STATES PATENT OFFICE.

GEORGE A. BOWEN, OF OSHKOSH, WISCONSIN, ASSIGNOR TO HERBERT M. CLARK, OF SAME PLACE.

RUNNING-GEAR FOR VEHICLES.

SPECIFICATION forming part of Letters Patent No. 381,981, dated May 1, 1888.

Application filed February 6, 1888. Serial No. 263,145. (No model.)

*To all whom it may concern:*

Be it known that I, GEORGE A. BOWEN, of Oshkosh, in the county of Winnebago and State of Wisconsin, have invented certain new and useful Improvements in Running-Gears for Wheeled Vehicles; and I do hereby declare the following to be a full, clear, and exact description of the invention, such as will enable others skilled in the art to which it appertains to make and use the same.

My invention relates to an improvement in the running-gears of wheeled vehicles.

The object of my present invention is to provide a running-gear for buggies and other similar wheeled vehicles that will combine strength and durability with lightness of the parts and elegance of form. The novel features consist, essentially, in the provision of two curved reaches and a short intermediate straight reach, which latter is clipped by one end to the rear axle near its center of length. The two curved reaches, having their rear ends clamped to the rear axle near the spindles to stiffen said axle, are curved toward each other forward of this axle, so as to have contact with the center reach near its forward end, the three reaches being clamped together at their point of junction, and the forward ends of the outside reaches spread apart to connect them with a head block. The device thus constructed produces a compact, light, strong, and shapely gear for wheeled vehicles, which affords a brace to the rear axle and its own parts to counteract the strains resulting from heavy loads or travel over rough road-beds, all of which will be more minutely described in the following specification, and pointed out in the claims.

Referring to the drawing, the figure is a plan view of the improved gear.

A represents the rear axle of a vehicle, which is made of any suitable material, preferably either wrought-iron or steel. The body of the axle A may be arched upwardly and flattened near its spindles on the upper surface at *a*.

Two curved reaches, B B, are provided. These are made of tough hard wood, and preferably bent into shape to afford lightness and strength.

The degree of curvature of the reaches B B should be such that their rear ends will conform to the upper surface of the axle-body A, on which they are placed at the points *a a*, near the spindles *e*, the ends of the reaches being clipped or otherwise secured to the axle-body by any proper means. As shown in the drawing, the reaches B B are so curved toward each other that at a proper point, *f*, between their front and rear ends their bodies are adjacent to each other, and from this point *f* they curve outwardly, the front ends being attached by any approved means to the head-block D.

At about the center of length of the rear axle, A, the rear end of the straight reach C is secured by a clip, *d*, or in any other suitable manner. The reach C is forwardly extended to lie between or upon the adjacent surfaces of the curved reaches B B, and the three reaches are banded, clipped, clamped, or bolted together at *c c*, and thus afford a secure and neat connection of these parts at their point of junction, as shown.

It is evident that the combination of the two curved reaches B B and center straight reach, C, with the head-block D and rear axle, A, will afford great strength and stiffness to resist direct and torsional strains, and also allow the parts to be made light in weight and of shapely neat design.

I am aware that there have been curved reaches used prior to my invention. These, however, are attached to a rear axle without the center brace or straight reach which I have combined therewith. The latter feature greatly increases the efficiency of the gear and permits the curved reaches as well as the axle to be made lighter in weight without sacrifice of necessary strength in these parts, as it affords additional resistance to withstand load strain and the twisting action incidental to travel over rough roadways.

Having fully described my invention, what I claim as new, and desire to secure by Letters Patent, is—

1. A running-gear for vehicles having a center straight reach and two curved reaches that are adapted to be clamped to a rear axle by their rear ends, and all secured together near the front end of the middle straight reach, substantially as set forth.

2. The combination, with a rear axle and a head-block, of two curved reaches and a straight reach located between the curved reaches and secured to these reaches and the axle, substantially as set forth.

3. The combination, with a rear axle and a head-block, of two curved reaches which are bent toward each other between their ends that are attached to the head-block and axle, and a straight reach having its rear end secured to the rear axle between the points of attachment of the curved reaches thereto, and its forward end secured to the adjacent bodies of the curved reaches, substantially as set forth.

In testimony whereof I have signed this specification in the presence of two subscribing witnesses.

GEORGE A. BOWEN.

Witnesses:
C. R. NEVITT, Jr.,
A. W. WEIDRED.